(12) United States Patent
Nakamura et al.

(10) Patent No.: US 6,944,111 B2
(45) Date of Patent: *Sep. 13, 2005

(54) INFORMATION READING AND RECORDING APPARATUS

(75) Inventors: Mizuki Nakamura, Iwata-gun (JP); Atsushi Kitamura, Iwata-gun (JP); Kozo Matsumoto, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 448 days.

This patent is subject to a terminal disclaimer.

(21) Appl. No.: 10/212,164

(22) Filed: Aug. 6, 2002

(65) Prior Publication Data

US 2003/0039196 A1 Feb. 27, 2003

(30) Foreign Application Priority Data

Aug. 13, 2001 (JP) ........................................ 2001-245491

(51) Int. Cl.⁷ ................................................ G11B 7/00
(52) U.S. Cl. .............................. 369/112.22; 369/112.24
(58) Field of Search ..................... 369/112.22, 112.24, 369/112.01, 112.23, 112.1, 112.29, 112.15, 44.11, 44.26, 44.33; 396/112.01

(56) References Cited

U.S. PATENT DOCUMENTS 6,660,986 B2 * 12/2003 Matsumoto et al. ..... 250/201.5

* cited by examiner

Primary Examiner—W. R. Young
Assistant Examiner—Van Pham
(74) Attorney, Agent, or Firm—Oliff & Berridge, PLC

(57) ABSTRACT

An information reading and recording apparatus includes a super-resolution cut-off filter having an annular metal reflection film at its center portion and disposed immediately before one of two objective lenses with a higher NA. When reading DVD, the one objective lens with a higher NA with the super-resolution cut-off filter disposed therebefore is positioned at the optical path. When reading CD, the other objective lens with a lower NA is positioned at the optical path. The laser beam reflected by a disk follows backward the incoming optical path to pass through a half mirror, and is received by a photo-detector to be converted into an electrical signal.

3 Claims, 11 Drawing Sheets

INFORMATION READING AND RECORDING APPARATUS

BACKGROUND OF THE INVENTION

1. Field of the Invention

The present invention relates to an information reading and recording apparatus for recording media, such as an optical disk.

2. Description of the Related Art

In the current information input/output apparatus using light, such as CD (compact disk) drive, light emitted from a laser beam source is converged as a micro spot constituting a recording pit on a track provided on a disk-like recording medium such as a CD, presence or absence of the pit is recorded as information, and the presence or absence of the pit on the track is detected by means of reflected light from the track thereby reading the information.

Recently, DVDs, which have a recording capacity about 7 times as large as that of CDs, are becoming remarkably popular along with the demand for an increased recording capacity. Increase in recording capacity means improvement of the recording density, which depends on the number of recording pits formed on a recording medium (hereinafter referred to as "disk"). In DVDs, one factor in increasing the recording density is to decrease the size of a recording pit, that is, decrease the diameter of a spot of laser beam radiated on the disk. The size of the micro spot to be radiated on the disk is proportional to the wavelength of the laser beam and is inversely proportional to the numerical aperture of an objective lens. Accordingly, for increasing the recording density, it is required to shorten the wavelength of the laser beam and to increase the numeral aperture of the objective lens.

However, DVDs are strongly required to be compatible with CDs from the viewpoint of backward compatibility of software. Originally, an optical head device was provided with one laser beam source with a wavelength of 635 to 650 nm and one objective lens having a numerical aperture of about 0.6 for the DVDs, and also with another laser beam source with a wavelength of 780 nm and another objective lens having a numerical aperture of about 0.45 for CDs, thereby ensuring the compatibility between the both disks.

However, when the numerical aperture of the objective lens is increased, the convergence state of laser beam deteriorates due to coma aberration with respect to the inclination of the optical disk Since coma aberration is proportion to the third power of the numerical aperture of the objective lens and to the thickness of the disk substrate, the thickness of the disk substrate of DVDs is designed to be about 0.6 mm, which is half that of CDs.

When the thickness of the substrate deviates from the designed value, spherical aberration occurs at a convergence position of light passing through the inward portion of the objective lens and a convergence position of light passing through the outward portion. Therefore, when CD is read by the objective lens with a numerical aperture of 0.6 optimized to the thickness of the DVD substrate, it is necessary to correct the spherical aberration by limiting the outward luminous flux incident on the lens or by slightly diverging the incident angle at the lens.

Thus, one objective lens can be used in common for the DVD and the CD with the necessary correction of spherical aberration, but two laser beam sources each having a different wavelength from other have to be provided for compatibility with a write-once-read-many CD. This is because a reflective recording layer of the write-once-read-many CD is formed of an organic dye material and thus has a reflection coefficient as low as 6% for laser beam having a wavelength of 635 nm to 650 nm, that is a wavelength appropriate to the DVD.

Thus, since the current DVD optical head apparatus is equipped with two laser beam sources respectively with a wavelength of 635 nm to 650 nm for the DVD and a wavelength of 780 nm for the CD, and since laser beams from the two light sources are to be guided to two respective objective lenses, parts such as a prism, aperture control means, and the like am required for respective laser beams, thereby prohibiting downsizing and cost reduction of the apparatus.

In order to solve the problems described above, various optical pickup apparatuses shown in FIGS. 10 to 13 have been proposed. Conventional optical pickup apparatuses will be outlined below.

FIG. 10 is a block diagram of a first conventional example. There are provided laser beam sources 91 and 12 to emit laser beams with a wavelength of 650 nm for the DVD and a wavelength of 780 nm for the CD, respectively, a wavelength selection prism 92 to guide any one of the laser beams along a same optical path, and a half mirror 11 to reflect and guide the laser beam to a collimating lens 13 and also to pass and guide a reflected laser beam from a disk 18 to a photodetector 90. There is further provided a reflection mirror 15 to direct the laser beam having passed through the collimating lens 13 to an objective lens 16 or 17 to converge the laser beam onto the disk 18 (either DVD 18a or CD 18b) placed on a drive mechanism (not shown) and rotated thereby.

The objective lens 16 has a high numerical aperture high NA) for DVDs, and the objective lens 17 has a low numerical aperture pow NA) for CDs. The drive mechanism (not shown) is adapted to select from and switch over between the objective lens 16 and 17 for DVDs and CDs. The laser beam reflected at the disk 18 and returning therefrom passes through the half mirror 11 and is received by the photodetector 90 that converts it into an electrical signal.

FIGS. 9A and 9B represent schematically the wavelength selection prism 92. The wavelength selection prism 92 is provided with an optical path control film 80 having wavelength transmission characteristic as shown in FIG. 9C. The optical path control film 80 is predisposed to block light having a wavelength of 700 nm and less, and to transmit light having a wavelength of 750 nm and more. Therefore, while light 81 with a wavelength of 780 nm incident on the optical path control film 80 is not blocked by the optical path control film 80 and travels straight through as shown in FIG. 9A, light 82 with a wavelength of 650 nm incident on the optical path control film 80 orthogonally to the light 81 is blocked by the optical path control film 80 and reflected by 90 degrees to be directed along the same optical path as the light 81 as shown in FIG. 9B.

The optical pickup apparatus of the first conventional example shown in FIG. 10 operates as follows. The laser beam source (laser diode (wavelength: 650 nm)) 91 for DVDs and the laser beam source (laser diode (wavelength: 780 nm)) 12 for CDs are disposed orthogonal to each other so that respective laser beams therefrom are guided into the same optical path by the wavelength selection prism 92. The laser beam has its optical axes reflected by 90 degrees by the half mirror 11, is converted into a parallel pencil by the collimating lens 13, and reflected and directed to the objective lens 16 or 17 by the reflecting mirror 15.

As described above, the objective lens 16 with a high NA for DVD and the objective lens 17 with a low NA for CD are switched over by means of the drive mechanism (not shown). When reading a DVD, the laser diode 91 for DVDs oscillates, and the objective lens 16 with a high NA for DVDs is placed on the optical path to converge the laser beam onto the disk (DVD) 18a. When reading a CD, the laser diode 12 for CDs oscillates, and the objective lens 17 with a low NA for CDs is placed on the optical path to converge the laser beam onto the disk (CD) 18b. The above-described switching mechanism is incorporated into an axial-displacement-type actuator apparatus (not shown). The laser beam reflected at either disk starts traveling in the backward direction along the incoming path, passes through the half mirror 11, and is directed to the photo-detector 90 to be converted into an electrical signal.

FIG. 11 is a block diagram of a second conventional example, in which laser diodes for DVDs and CDs and a photo-detector are packaged into an enclosure thereby constituting an integrated laser unit, thus making it possible to reduce the number of components in comparison with the first conventional example. Specifically, an integrated laser unit 201 for CDs includes integrally a laser beam source with a wavelength of 780 nm appropriate for CDs and a photodetector for CDs, and an integrated laser unit 202 for DVDs includes integrally a laser beam source with a wavelength of 650 nm appropriate for DVDs and a photo-detector for DVDs. Laser beams from the integrated laser unit 201 for CDs and the integrated laser unit 202 for DVDs are each made incident on a wavelength selection prism 92. This optical pickup apparatus operates in the same way as the first conventional example in FIG. 10, and the description thereof is omitted.

FIG. 12 is a block diagram showing a third conventional example, which differs from the first conventional example in that there are provided: an aperture control filter 103 disposed immediately before an objective lens 16; a wavelength selection prism 92 for separating a laser beam reflected at the disk according to the wavelength of the laser beam; and two photo-detectors 101 for CDs and 102 for DVDs each for receiving a laser beam from the wavelength selection prism 92.

FIG. 7 represents schematically the aperture control filter 103. An anti-reflection film AR is formed entirely on one surface 30A of a sheet glass 60 and partly only at a central portion on the other surface 30B, and a wavelength selection film 61 is formed at other portion than the central portion on the other surface 30B, where an anti-reflection film AR is not formed.

FIG. 8 shows the relationship between the wavelength and the transmittance in the wavelength selection film 61 used in the aperture control filter 103. As clear in FIG. 8, the transmittance decreases for wavelengths from 725 nm upward. This means that the laser beam with a wavelength of 780 nm appropriate for CDs is reflected.

The optical pickup apparatus of the third conventional example shown in FIG. 12 operates as follows. A laser diode (wavelength: 650 nm) 91 for DVDs and a laser diode (wavelength: 780 nm) 12 for CDs as light sources are disposed orthogonal to each other so that respective laser beams emitted from the laser diodes 91 and 12 are introduced into the same optical path by the wavelength selection prism 92. The laser beam has its optical axes direction changed by 90° by the half or 11, is formed into a parallel luminous flux by a collimating lens 13, reflected by a reflecting mirror 15 toward a disk 18 (18a, 18b), passes through the aperture control filter 103, and is made incident on the objective lens 16 having a high numerical aperture for DVDs. The objective lens 16 functions in the same way as described for FIG. 11, and the description thereof is omitted.

As described above, the aperture control filter 103 has different optical film characteristics between at its central circular portion and at the other portion therearound. While the other portion transmits light with a wavelength of 650 nm and reflects light with a wavelength of 780 nm, the central circular portion transmits both. When reading DVDs, the luminous flux is not affected by the aperture control filter 103 and is entirely made incident on the objective lens 16 to be converged onto the disk 18a. When reading CDs, the luminous flux is affected by the aperture control filter 103 to pass therethrough part all at its central circular portion, and is made incident on the objective lens 16, whereby the effective NA is decreased, and light is converged onto the disk 18b with a low aberration.

However, the spherical aberration is still present after only limiting the aperture to decrease the effective NA. The laser diode 12 for CDs must be positioned closer to the collimating lens 13 so as to cancel the spherical aberration, so that a light beam is made incident on the objective lens 16 with slight divergence. Therefore, the converging position of reflected light from the disk 18 varies according to the distance therebetween, so the distance to the photo-detector 101 for CDs cannot be identical with the distance to the photodetector 102 for DVDs, thus requiring two photo-detectors. The two photo-detectors receive respective light beams having a different wavelength from each other due to the wavelength selection prism 92.

FIG. 13 is a block diagram of a fourth conventional example, in which an integrated laser unit 201 for CDs and an integrated laser unit 202 for DVDs each having a laser diode and a photo-detector packaged into an enclosure are used, and the number of components can be reduced in comparison with the third conventional example. The integrated laser unit 201 for CDs and the integrated laser unit 202 for DVDs are configured in the same way as those in FIG. 11, and the description thereof is omitted. And, they operate in a similar way to those of the third conventional example shown in FIG. 12, and the description thereof is omitted.

The apparatuses of the conventional examples have the following problems.

In the first conventional example, two laser diodes with different wavelength are required for ensuring the compatibility among DVDs, CDs, CD-R/RWs(CD Recordable/Re-Writable), and a means to introduce two laser beams into the same optical path is also required.

In the second conventional example, in addition to the problem associated with the first conventional example, expensive integrated laser units are required, resulting in difficulty with cost reduction.

In the third conventional example, two laser diodes with different wavelengths are required, and the cost of the aperture control filter increases for compensating the phase difference generated between two kinds of films showing transmission characteristics different from each other, resulting in difficulty with cost reduction.

In the fourth conventional example, in addition to the problem associated with the third conventional example, expensive integrated laser units are required, also resulting in difficulty with cost reduction.

SUMMARY OF THE INVENTION

The present invention has been made in light of the above, and it is an object of the present invention to provide a small, low-profile, simple and inexpensive information reading and recording apparatus by providing a super-resolution cut-off means having a higher performance and generating smaller noise than a conventional super-resolution cut-off filter while compatibility among DVD, CD and CDR/RW with different recording densities is ensured by an inexpensive laser diode with a long oscillation wavelength.

In order to realize the above object, according to a first aspect of the present invention, an information reading and recording apparatus comprises: one semiconductor laser; a collimating lens to convert the divergence angle of a laser beam emitted from the semiconductor laser; two objective lenses having respective numerical apertures suitable for reading and recording two types of recording media each having a recording density different from other, and adapted to converge the laser beam onto the respective recording media; a super-resolution cut-off filter comprising a light-transmissible substrate, having an annular reflecting means at a center portion of the substrate surface, and disposed immediately before one objective lens of the two corresponding to one recording medium of the two types with a higher recording density; and a photo-detector adapted to detect a reflected laser beam from any one of the two types of recording media According to second and third aspects of the present invention, in the information reading and recording apparatus of the first aspect, the super-resolution cut-off filter has an anti-reflection film formed entirely on one side surface of the substrate and has an anti-reflection film formed partly on the other side surface of the substrate, that is, formed only at portions other then an annular portion corresponding to the reflecting means, and the annular portion is provided with a metal reflection film (second aspect) and with a reflection film formed of a dielectric multilayer (third aspect).

BRIEF DESCRIPTION OF THE DRAWINGS

FIGS. 4A and 4b show the relationship between the main lobe and n-th order side lobes (S1, S2 and S3) in a conventional embodiment and the present invention, respectively, FIGS. 4C is a schematic representation of a measurement system in FIGS. 4A and 4B, and FIG. 4D shows the dimensions in both a conventional embodiment and the present invention;

FIGS. 5A and 5C are schematic representations of the optical system, and FIGS. 5B and 5D show the distribution of the focal spot;

FIGS. 9A and 9B are schematic representations of the optical path of the incident light, and FIG. 9C shows a characteristic curve of an optical path control film.

DESCRIPTION OF THE PREFERRED EMBODIMENTS

In the present invention, semiconductor laser and a filter with super resolution (super-resolution cut-off filter) disposed immediately before an objective lens corresponding to a recording medium of high density are provided, whereby a micro pit information on a disk with a high recording density such as a DVD can be read using only one laser diode adapted for CDs (wavelength: 780 nm).

The super-resolution cut-off filter used in the present invention is outlined below. The super-resolution cut-off filter is an optical filter in the coherent light, realized using a technology referred to as super-resolution. The super resolution is a conventionally-known technology described in detail in HIKARI-GIJUTSU CONTACT VOL. 33, NO. 11 (1995), etc., and the description thereof is omitted.

The resolution of an optical instrument is related to the diameter of an optical spot converged by the objective lens. As well known, the main lobe diameter W of the converged spot according to the paraxial approximation is expressed by: $W = 1.22\lambda/NA$, where $\lambda$ is the wavelength of laser beam and NA is the numeral aperture. In order to decrease the main lobe diameter W, i.e., to realize a high resolution, the wavelength $\lambda$ must be small, and the numeral aperture NA must be large.

Figure 5A:
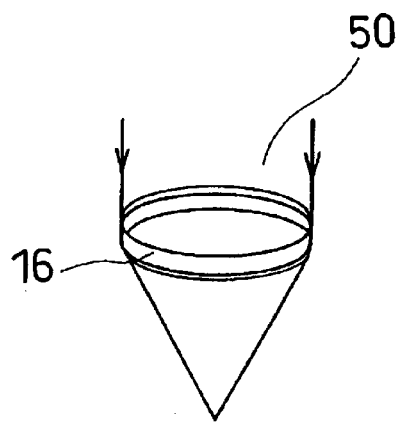
FIGS. 5A to 5D are schematic representations. The distribution of the main lobe M and the side lobe S of a focal spot when a laser beam is converged.
Figure 5C:
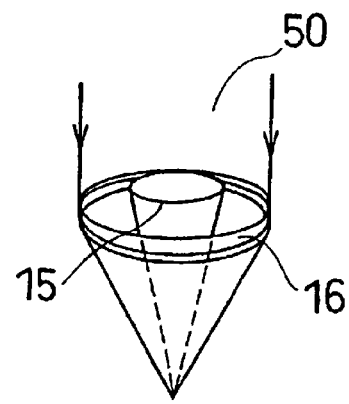
Figure 5B:
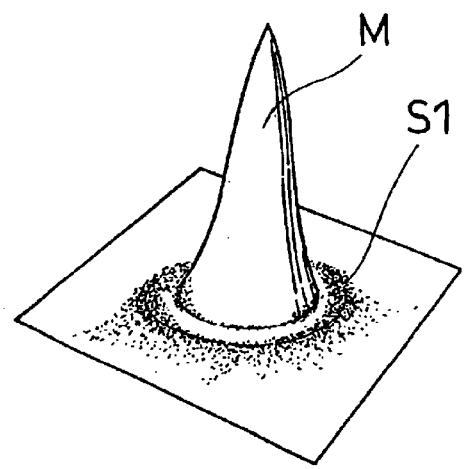

Referring to FIGS. 5A to 5B, the value of the main lobe diameter W is referred to as diffraction threshold spot diameter, and this value is normally the minimum spot diameter practically feasible, and its distribution is as shown in FIG. 5B when a laser beam 50 is made incident on an objective lens 16 shown in FIG. 5A. That is, the n-th order side lobes are generated in slight amounts compared with the main lobe M.

Figure 5D:
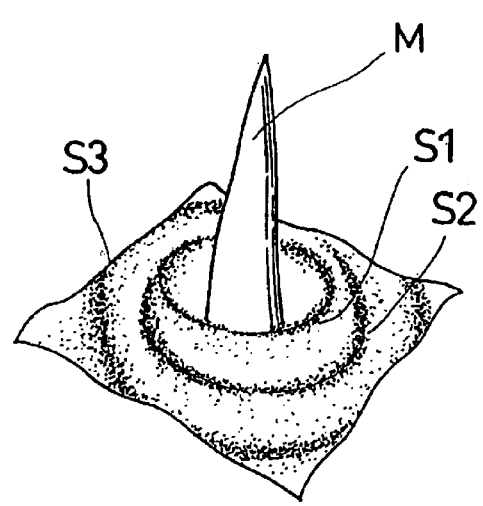

If a circular light blocking plate 15 is disposed immediately before the objective lens 16 as shown in FIG. 5C so as to deform the amplitude distribution in the lens aperture to be small at the central portion and large at the outer portion, the main lobe diameter W of the converged spot can be made smaller than the normal diffraction threshold value, realizing the distribution shown in FIG. 5D.

Since the main lobe diameter W can be smaller than the normal diffraction threshold value, a high resolution can be realized. On the other hand, the amplitude of the n-th order side lobes (S1, S2, S3) increases as shown in FIG. 5D. Light beams from the n-th order side lobes, when used in the apparatus for reading and recording information on a recording medium, affect adjacent pits and adjacent tracks of the recording medium and undesirably get signals from the adjacent pits and adjacent tracks mixed in, causing the signal quality to deteriorate and the apparatus to malfunction.

Figure 3:
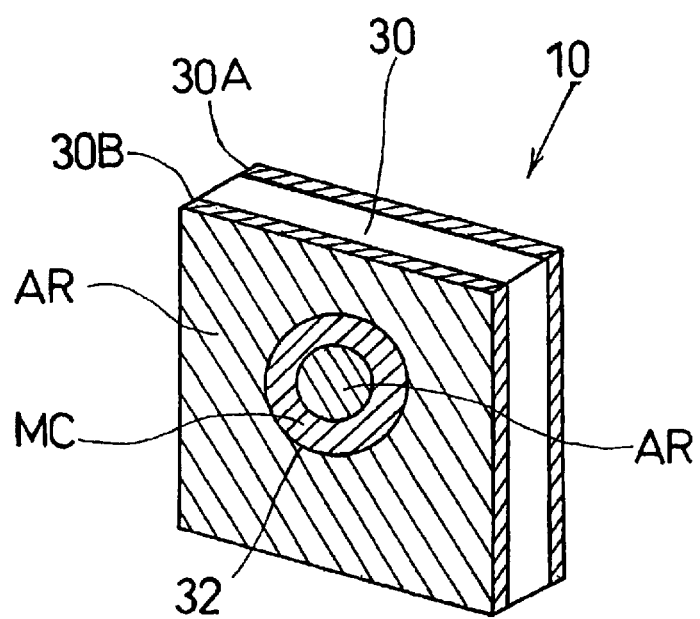
FIG. 3 is a schematic representation of a structure of a super-resolution cut-off filter of the present invention.

Referring to FIG. 3, a super-resolution cutoff film 10 of the present invention is structured such that an anti-reflection m AR comprising a mono-layer or a multi-layer is formed entirely on one side surface 30A of a sheet glass 30 and pal on the other side surface 30B at portions except an annular portion 32 which is located at its center and provided with a metal reflection film MC. Even without the anti-reflection films AR, the super-resolution cut-off filter 10 can fulfill its function. The sheet glass 30 may be replaced by a substrate formed of a light-transmissible resin material. And, the metal reflection film MC may be replaced by a reflection film formed of a dielectric multi-layer, and in which case, a same common manufacturing process can be advantageously used in forming the anti-reflection film.

Figure 4A:
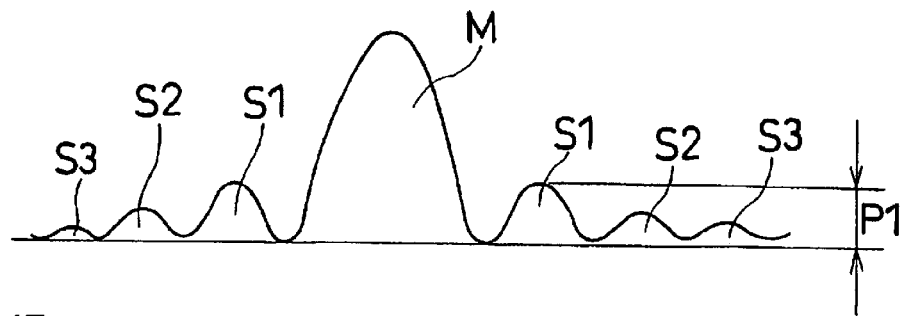
FIGS. 4A to 4D relate to super-resolution cut-off filters.
Figure 4B:
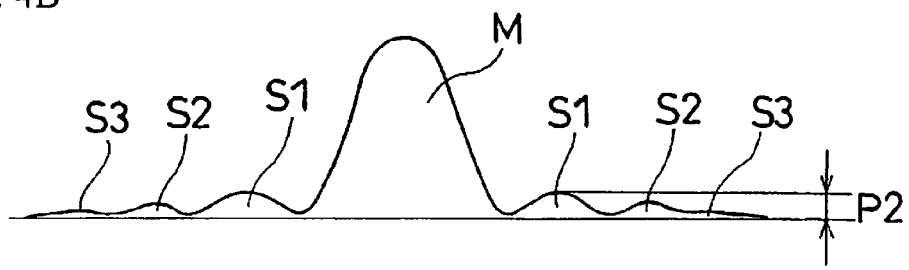
Figure 4C:
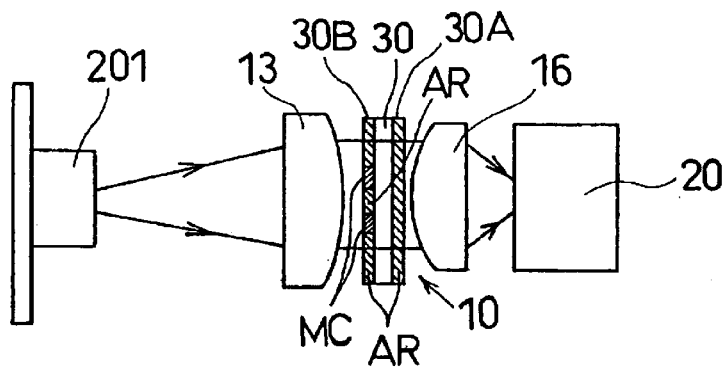

FIGS. 4A to 4D relate to super-resolution cut-off filters. In FIG. 4C, numeral 201 denotes a laser diode for CDs (wavelength: 780 nm). The objective lens 16 has an NA of 0.6, and the super-resolution cut-of filter 10 is structured such that an anti-reflection film AR is formed entirely on one side 30A of the sheet glass 30 described in FIG. 3 and partially on the other side 30B, specifically, except its center portion, where the metal reflection film MC is disposed. Numeral 20 denotes a beam spot measuring instrument corresponding to NA=0.6, and numeral 13 denotes a collimating lens.

Figure 4D:
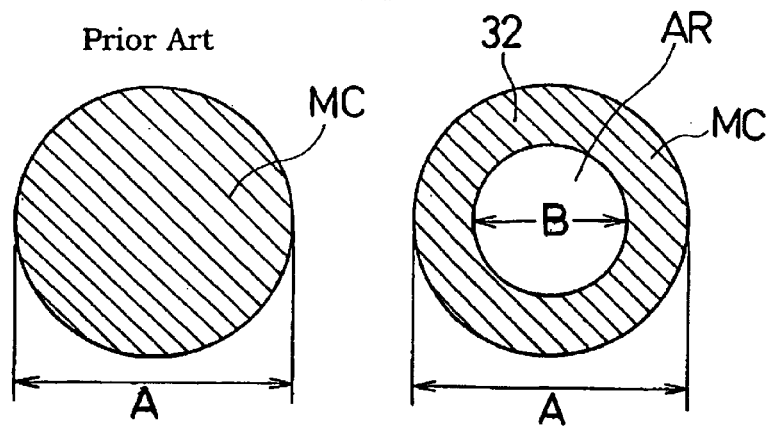

In FIG. 4D, A and B are the outside diameter and the inside diameter of an annular portion in the super-resolution cut-off filter 10 of the present invention, respectively, the outside diameter A is equal to the diameter of the metal reflection film MC in the conventional super-resolution cut-off filter 10, and the ratio of B/A is set to be about 1/2. The metal reflection film MC is formed on the annular portion 32.

The result obtained by FIG. 4C is described with reference to FIGS. 4A and 4B. In the conventional super-resolution cut-off filter, the amplitude P1 of the primary side lobe S1 exceeds 10% of that of the main lobe as shown in FIG. 4A. On the other hand, in the super-resolution cut-off filter of the present invention, the amplitude P2 of the primary side lobe S1 is 5% or less of that of the main lobe as shown in FIG. 4B.

Figure 6:
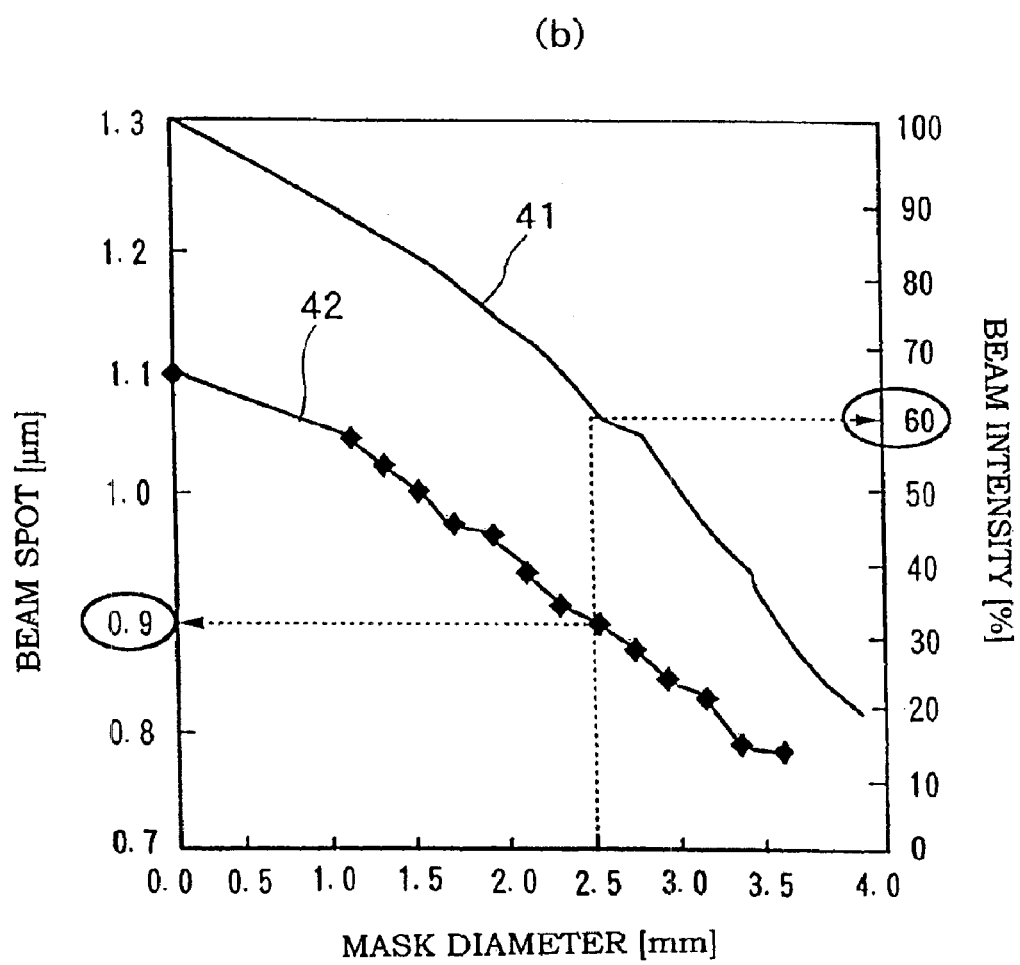
FIG. 6 shows graphs indicating the measurement data for determining the outside diameter of an annular portion of the super-resolution cut-off filter.
Figure 7:
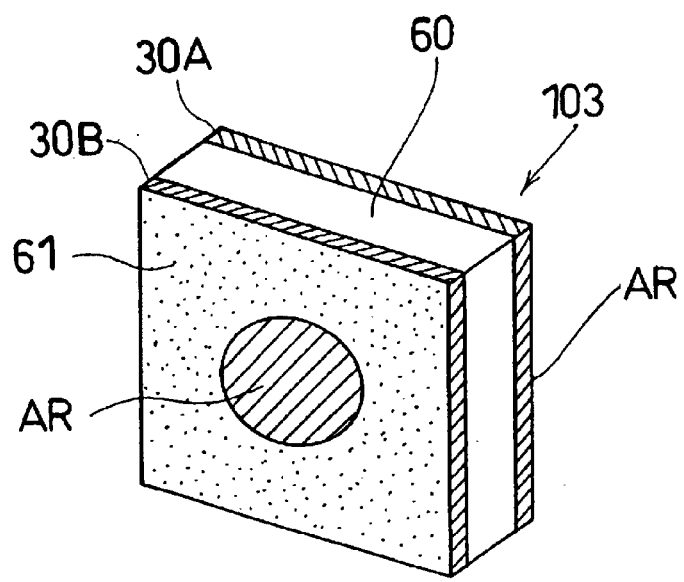
FIG. 7 is a schematic representation of a conventional aperture control filter.
Figure 8:
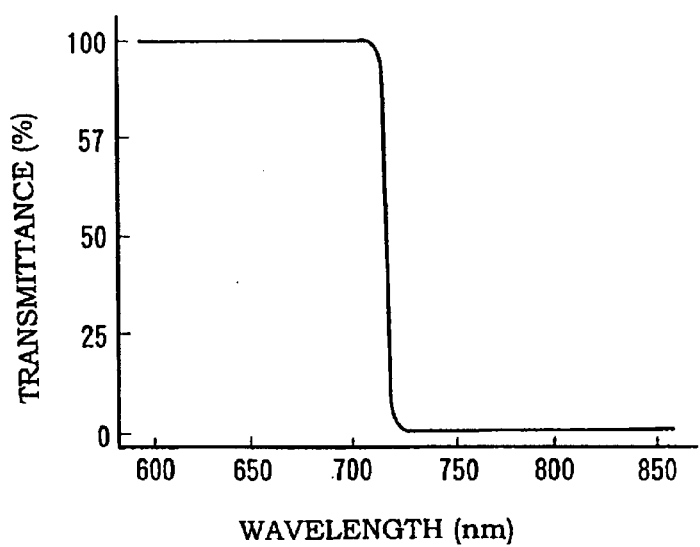
FIG. 8 shows a graph indicating the relationship between the wavelength and the transmittance in a wavelength selection film used in the conventional aperture control filter.
Figure 9A:
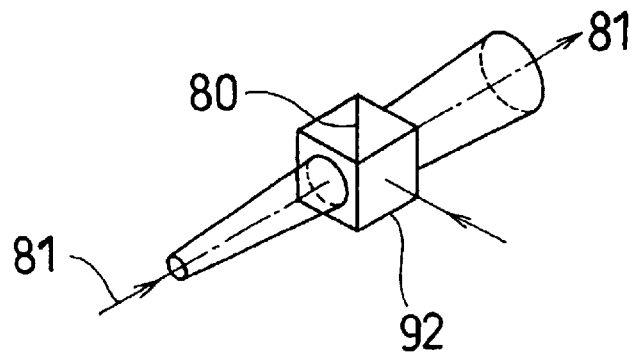
FIGS. 9A to 9C relate to a conventional wavelength selection prism.
Figure 9B:
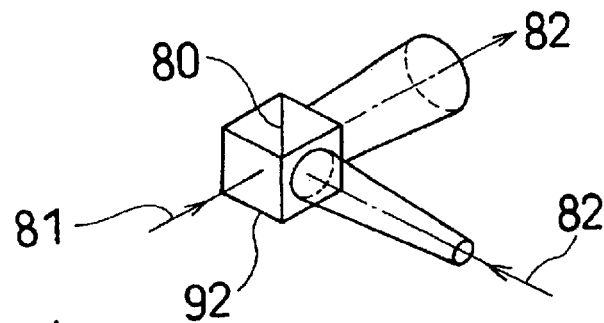
Figure 9C:
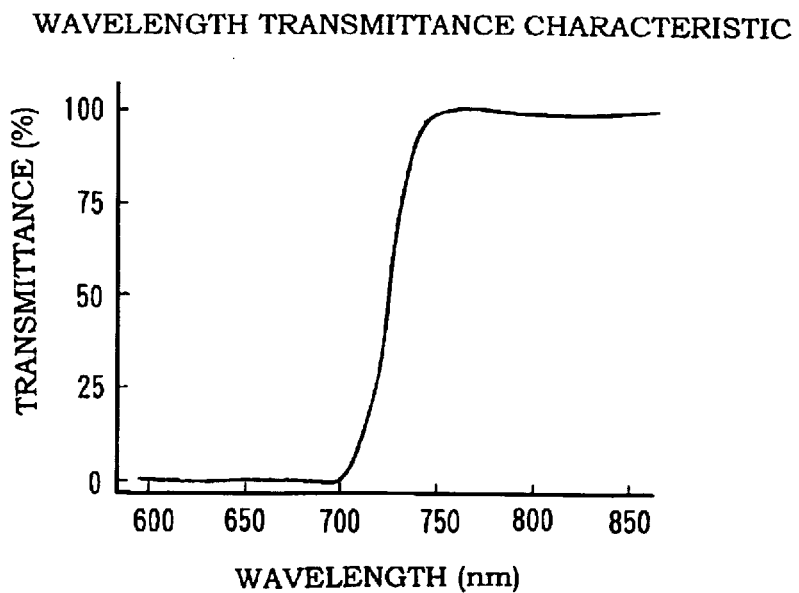
Figure 10:
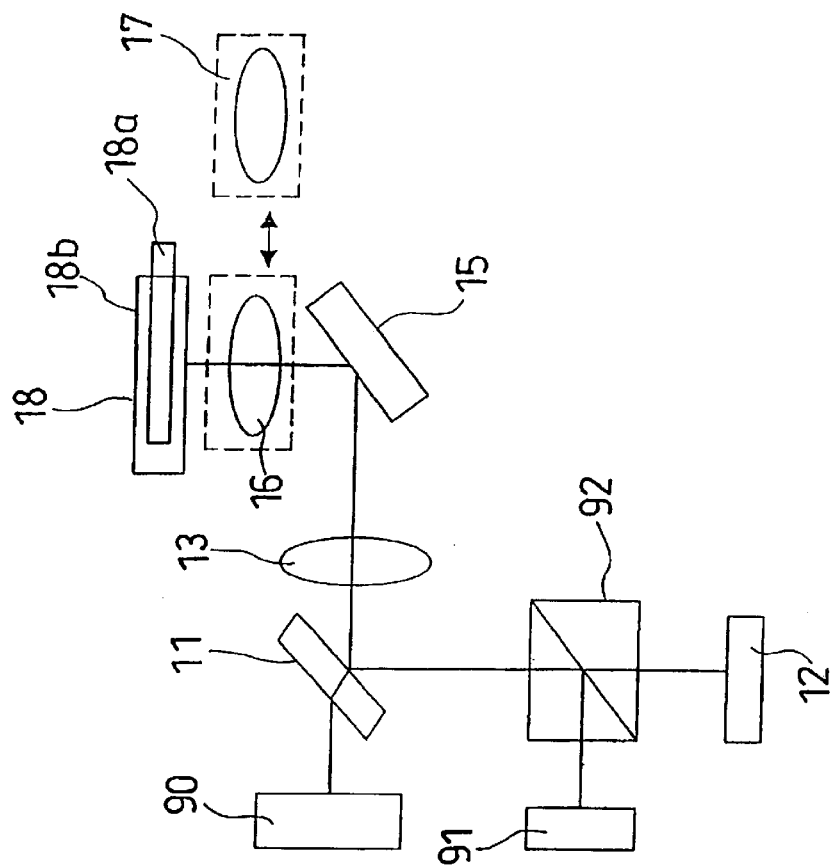
FIG. 10 is a block diagram of a first conventional example
Figure 11:
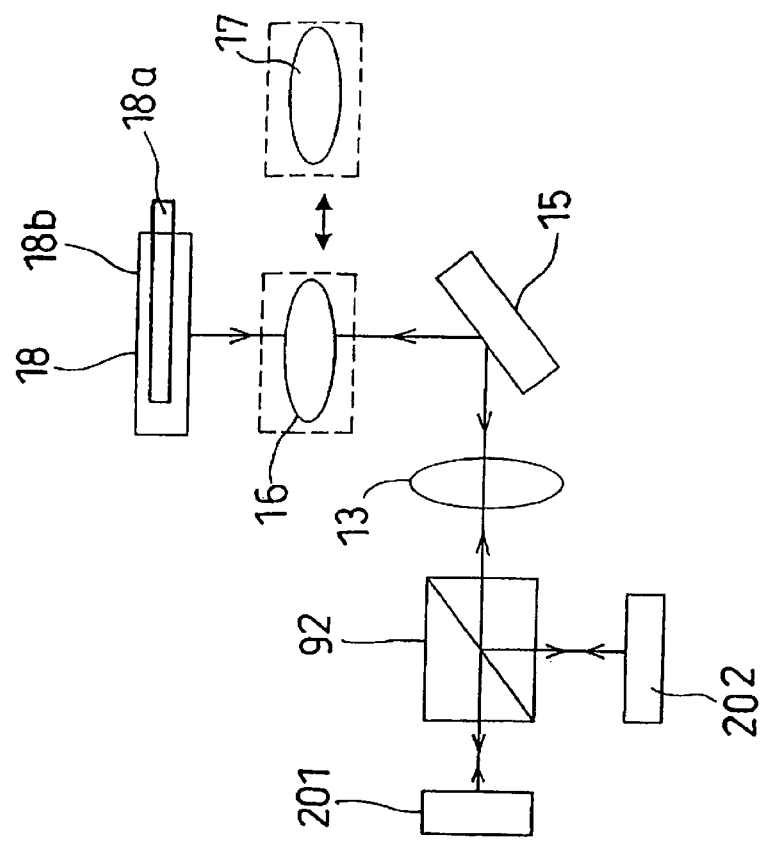
FIG. 11 is a block diagram of a second conventional example.
Figure 12:
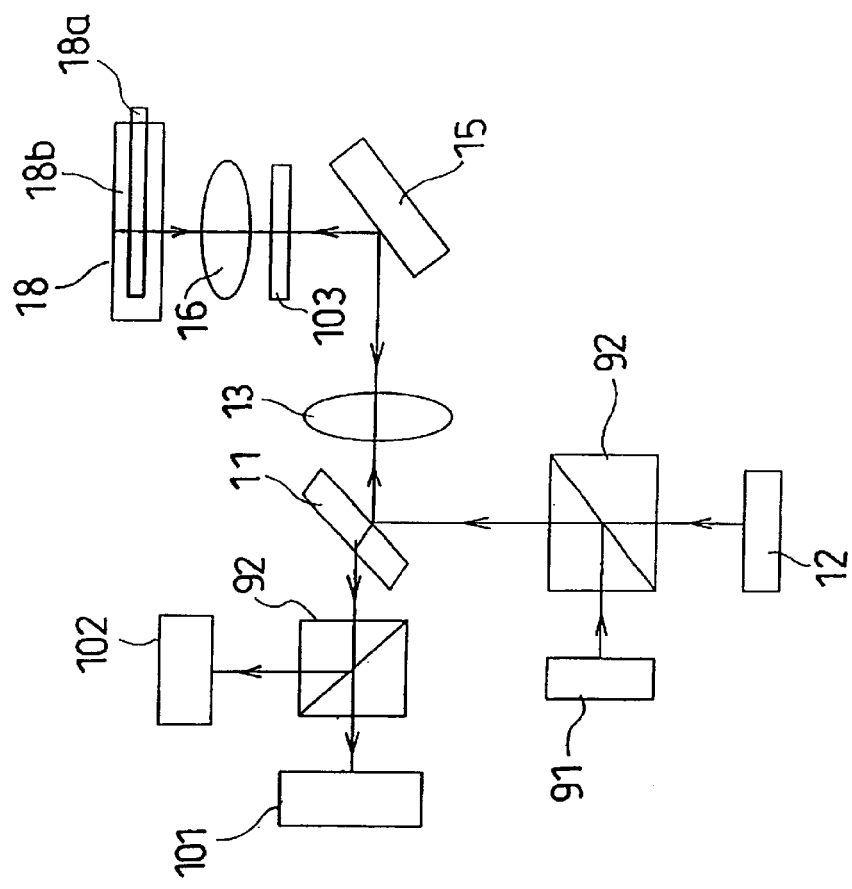
FIG. 12 is a block diagram of a third conventional example.
Figure 13:
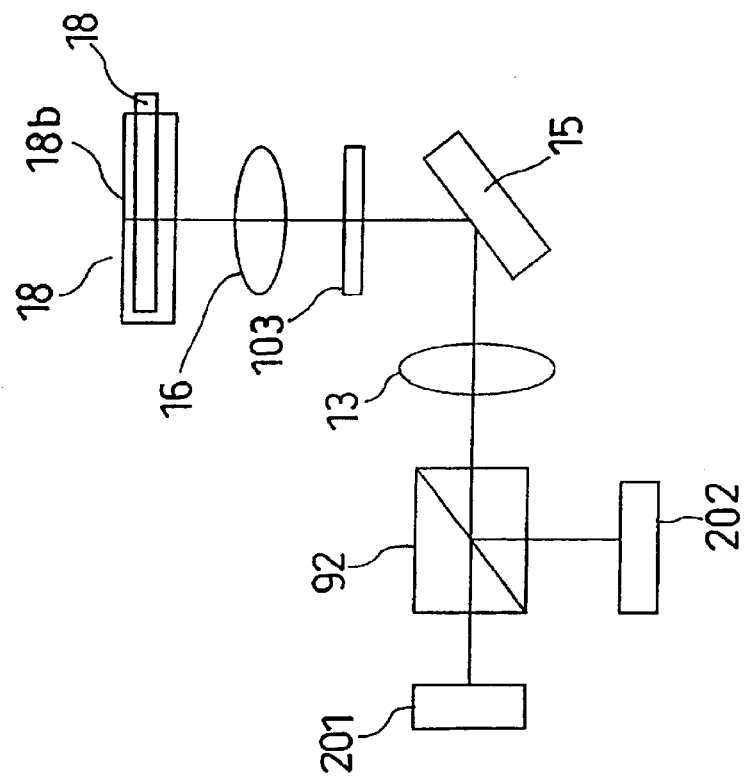
FIG. 13 is a block diagram of a fourth conventional example.

Referring to FIG. 6, the measurement is made using the conventional super-resolution cut-off filter 10, because the diameter A of the metal reflection film MC in the conventional super-resolution cut-off filter 10 is equal to the outside diameter A of the super-resolution cut-off filter 10 of the present invention as described above, and the widths of respective main lobes are almost equal to one another.

The left vertical axis indicates the spot diameter of the laser beam converged on the photo-detector in the integrated laser unit 201 for CDs, and the right vertical axis indicates the intensity (relative intensity) of the laser beam. As clear in FIG. 6, when the diameter of mask (the super-resolution cut-off filter 10) is increased, the spot diameter of the laser beam decreases (see the data 42), and at the same time, the intensity of the laser beam also decreases (see the data 41).

The spot diameter must be about 0.9 $\mu$m for DVDs, and it is understood that the diameter A of the super-resolution cut-off filter 10 is set to be about 2.5 mm in order to obtain such a spot diameter. Since the ratio of B/A, i.e., the ratio of the inside diameter B to the outside diameter A of the super-resolution cut-off filter 10 of the present invention is determined to be 1/2, the inside diameter B is about 1.25 mm. In this case, the intensity of the laser beam is reduced to 60%, so the intensity of the laser beam source is adjusted by a drive circuit (not shown) so that the intensity required for recording on and reading from DVDs can be ensured when the super-resolution cut-off filter 10 with such a dimension is used for the apparatus.

Figure 1:
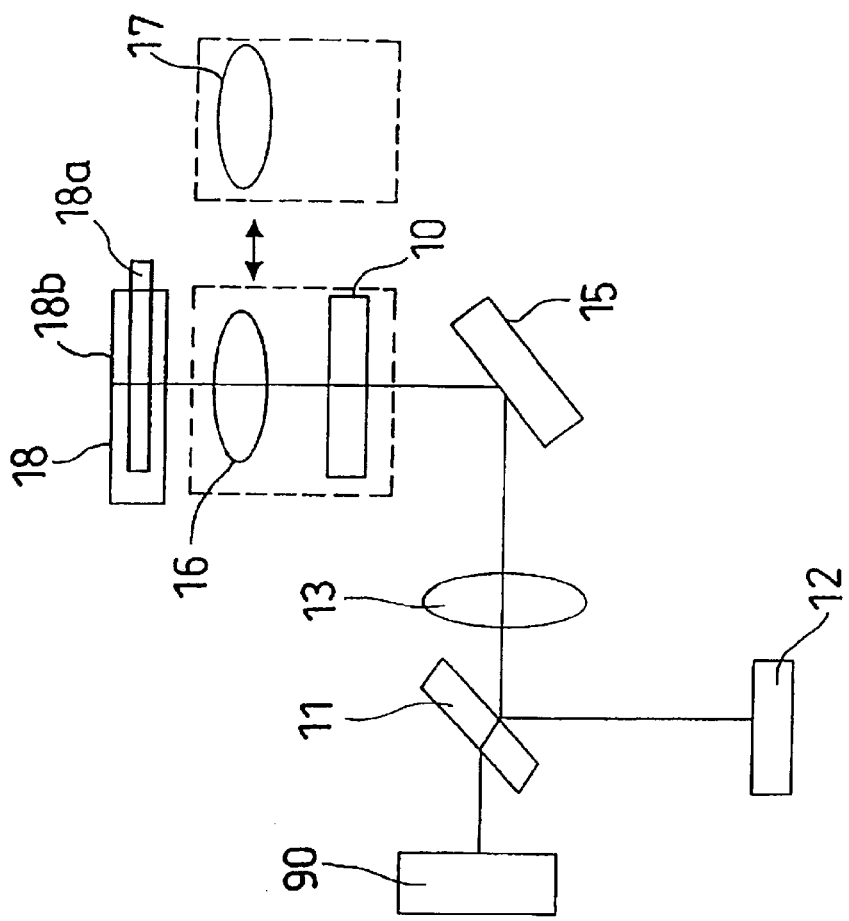
FIG. 1 is a block diagram of an embodiment of the present invention.

A first embodiment of the present invention will be described with reference to FIG. 1. A laser diode 12 appropriate for CDs (wavelength: 780 nm) and a half mirror 11 which is a beam splitter element to guide a laser beam to a collimating lens 13 and to make a reflected laser beam from a disk 18 incident on a photo-detector 90 corresponding to the wavelength of the laser diode 12 for CDs are provided. The laser beam having passed through the collimating lens 13 is reflected by a reflecting mirror 15 toward an objective lens 16 or 17, and made incident on the disk 18. The reflecting mirror 15 is not an essential optical component, and an optical system can be constituted without using any reflecting minor. The disk 18 (DVD 18a or CD 18b) is put on a drive mechanism (not shown), and rotated thereby.

The objective lens 16 has a high numeral aperture (high NA) for DVDS, and the objective lens 17 has a low numeral aperture (low NA) for CDs. The aforementioned super-resolution cut-off filter 10 having at its center the annular metal reflection film as shown in FIG. 3 is disposed immediately before the objective lens 16. When reading DVDs, the objective lens 16 and the super-resolution cut-off filter 10 are set in the optical path. When reading CDs, the objective lens 17 is set in the optical path. The objective lens 16 coupled with the super-resolution cut-off filter 10, and the objective lens 17, together with a switching means to switch over these, are integrated with an actuator drive system to control the position with respect to the recording surface of the recording medium, and can be switched over for DVDs and CDs by the drive mechanism (not shown).

The laser beam reflected by the disk 18 follows backward the incoming optical path to pass through the half mirror 11 and be incident on the photo-detector 90 to convert the incident laser beam into an electrical signal The information reading and recording apparatus in FIG. 1 operates as below. When the apparatus reads and records on DVDs, the laser beam emitted from the laser diode 12 for CD (wavelength: 780 nm) is reflected by the half mirror 11 and made incident on the collimating lens 13. The laser beam with divergence is collimated by the collimating lens 13, has its optical path changed by the reflecting mirror 15, passes through the super-resolution cut-off filter 10, is converged into the beam spot diameter described in FIG. 4 by the objective lens 16, and is made incident on the recording surface of the disk (DVD) 18a.

The laser beam reflected at the recording surface of the DVD 18a follows backward the incoming optical path to pass through the objective lens 16 and the super-resolution cut-off filter 10, and to be incident on the reflecting mirror 15. The laser beam having its optical path changed by the reflecting mirror 15 is converged by the collimating lens 13, passes through the half mirror 11, and is made incident on the photo-detector 90 to be converted into an electrical signal When recording the signal on DVDs, the intensity of the laser beam is increased to a predetermined value, and when reading the recorded information, the intensity of the laser beam is decreased to a predetermined value. Such adjustment is made by a control circuit and a laser drive circuit (both not shown).

When reading CDs, the objective lens 17 for CDs is selected by a drive mechanism (not shown) to duly operate. When reading information recorded on CDs, the intensity of the light beam is adjusted to a predetermined value by a control circuit and a laser drive circuit (both not shown).

Figure 2:
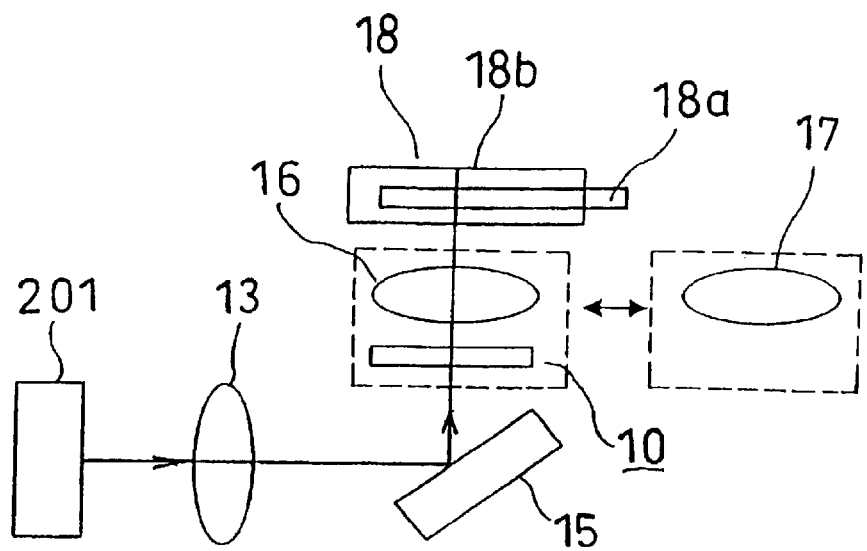
FIG. 2 is a block diagram of another embodiment of the present invention.

A second embodiment of the present invention will be described with reference to FIG. 2. The information reading and recording apparatus comprises an integrated laser unit 201 having a semiconductor laser appropriate for CDs and a photodetector corresponding to the semiconductor laser packaged into an enclosure, a collimating lens 13 to collimate the laser beam, a reflecting mirror 15 to guide the laser beam having passed through the collimating lens 13 toward the disk 18, an objective lens 16 or 17, and a super-resolution cut-off filter 10 disposed immediately before the objective lens 16.

The integrated laser unit 201 has a laser beam source with a wavelength of 780 nm, which is appropriate to CDs, and which is integrated with the photo-detector. The objective lenses 16 and 17, and the super-resolution cut-off filter 10 in the second embodiment are structured and arranged in the same way as those in the first embodiment, and description thereof is omitted.

The information reading and recording apparatus in FIG. 2 operates in a similar way to that in FIG. 1 except what is described below.

The laser beam is emitted from the semiconductor laser of the integrated laser unit 201 and directly incident on the collimating lens 13.

The laser beam going to the disk 18, returning therefrom, and converged by the collimating lens 13 is directly made incident on the photo-detector of the integrated laser unit 201, and is thereby converted into an electrical signal.

According to the first aspect of the present invention, information in two kinds of recording media each having a recording density from other is read and recorded with reduced influence of the side lobes, whereby the recording media such as DVD, CD, and CD-R/RW with different recording densities can be compatibly read and recorded only by one inexpensive laser diode appropriate for law recording density media.

According to the second and third aspects of the present invention, information is read and recorded with reduced influence of the side lobes, the phase compensation between the anti-reflection film and the wavelength selection film is unnecessary, and the information reading and recording apparatus can be further cost-effective with a simple configuration.

What is claimed is:

1. An information reading and recording apparatus comprising:

a semiconductor laser;

a collimating lens adapted to converge a divergence angle of a laser beam emitted from the semiconductor laser;

two objective lenses having respective numeral apertures suitable for reading and recording two types of recording media each having a recording density different from other, and adapted to converge the laser beam onto respective recording media;

a super-resolution cut-off filter comprising a light-transmissible substrate, having an annular reflecting means at a center portion of the substrate, and disposed immediately before one objective lens of the two corresponding to one recording medium of the two types with a higher recording density; and a photo-detector adapted to detect a reflected laser beam from any one of the two types of recording media, whereby information is read and recorded compatibly in the two types of recording media.

2. An information reading and recording apparatus according to claim 1, wherein the super-resolution cut-off filter has an anti-reflection film formed entirely on one side surface of the substrate, and has an anti-reflection film formed partly on the other side surface of the substrate at portions other than an annular portion corresponding to the reflecting means, the annular portion being provided with a metal reflection film.

3. An information reading and recording apparatus according to claim 1, wherein the super-resolution cut-off filter has an anti-reflection film formed entirely on one side surface of the substrate, and has an anti-reflection film formed partly on the other side surface of the substrate at portions other than an annular portion corresponding to the reflecting means, the annular portion being provided with a reflection film formed of a dielectric multi-layer.

* * * * *